US011455097B2

(12) United States Patent
Ben Dayan et al.

(10) Patent No.: US 11,455,097 B2
(45) Date of Patent: Sep. 27, 2022

(54) RESOURCE MONITORING IN A DISTRIBUTED STORAGE SYSTEM

(71) Applicant: Weka.IO LTD, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Tomer Filiba, Tel Aviv (IL)

(73) Assignee: Weka.IO Ltd.

( * ) Notice: Subject to any disclaimer, the term of this patent is extended or adjusted under 35 U.S.C. 154(b) by 608 days.

(21) Appl. No.: 15/041,236

(22) Filed: Feb. 11, 2016

(65) Prior Publication Data

US 2017/0222946 A1 Aug. 3, 2017

Related U.S. Application Data

(60) Provisional application No. 62/288,106, filed on Jan. 28, 2016.

(51) Int. Cl.
| | |
|---|---|
| *G06F 3/06* | (2006.01) |
| *G06F 16/182* | (2019.01) |
| *H04L 67/01* | (2022.01) |
| *H04L 47/70* | (2022.01) |
| *H04L 67/06* | (2022.01) |
| *H04L 43/0882* | (2022.01) |

(Continued)

(52) U.S. Cl.
CPC ............ *G06F 3/0607* (2013.01); *G06F 3/061* (2013.01); *G06F 3/0604* (2013.01); *G06F 3/067* (2013.01); *G06F 3/0613* (2013.01); *G06F 3/0619* (2013.01); *G06F 3/0635* (2013.01); *G06F 3/0643* (2013.01); *G06F 3/0647* (2013.01); *G06F 3/0656* (2013.01); *G06F 3/0665* (2013.01); *G06F 3/0673* (2013.01); *G06F 3/0685* (2013.01); *G06F 16/182* (2019.01); *G06F 16/1827* (2019.01); *H04L 43/0882* (2013.01); *H04L 43/16* (2013.01); *H04L 47/12* (2013.01); *H04L 47/6275* (2013.01); *H04L 47/70* (2013.01); *H04L 49/90* (2013.01); *H04L 67/01* (2022.05); *H04L 67/06* (2013.01); *H04L 67/1097* (2013.01)

(58) Field of Classification Search
CPC ........................................................ G06F 9/50
USPC ........................................................ 709/226
See application file for complete search history.

(56) References Cited

U.S. PATENT DOCUMENTS

| 6,385,673 B1 | 5/2002 | DeMoney |
|---|---|---|
| 7,447,839 B2 | 11/2008 | Uppala |

(Continued)

*Primary Examiner* — Kevin S Mai
(74) *Attorney, Agent, or Firm* — McAndrews, Held & Malloy, Ltd

(57) ABSTRACT

A distributed electronic storage system (DESS) comprises a plurality of computing devices communicatively coupled via one or more network links and having a file system distributed among them. The DESS comprises management circuitry that resides on the first computing device. The management circuitry is operable to generate an indication of a load on a first resource that resides on the first computing device. The management circuitry is operable to receive, via the one or more network links, an indication of a load on a second resource that resides on a second computing device of the plurality of computing devices. The management circuitry is operable to determine a condition of the DESS based on the indication of the load on the first resource and the indication of the load on the second resource.

22 Claims, 15 Drawing Sheets

(51) Int. Cl.
    *H04L 47/12*        (2022.01)
    *H04L 47/6275*      (2022.01)
    *H04L 49/90*        (2022.01)
    *H04L 67/1097*      (2022.01)
    *H04L 43/16*        (2022.01)

(56) References Cited

U.S. PATENT DOCUMENTS

| | | | |
|---|---|---|---|
| 7,739,677 B1* | 6/2010 | Kekre | G06F 11/202 709/214 |
| 7,877,511 B1 | 1/2011 | Berger et al. | |
| 8,347,010 B1 | 1/2013 | Radovanovic | |
| 8,918,478 B2 | 12/2014 | Ozzie et al. | |
| 2003/0115218 A1 | 6/2003 | Bobbitt et al. | |
| 2004/0098415 A1 | 5/2004 | Bone et al. | |
| 2004/0109410 A1* | 6/2004 | Chase | H04L 12/2602 370/229 |
| 2005/0289152 A1 | 12/2005 | Earl et al. | |
| 2012/0204187 A1* | 8/2012 | Breiter | G06F 9/5072 718/105 |
| 2013/0103787 A1 | 4/2013 | Glover et al. | |
| 2013/0227111 A1* | 8/2013 | Wright | G06F 9/5083 709/223 |
| 2013/0272121 A1* | 10/2013 | Stanwood | H04L 47/2475 370/230 |
| 2013/0297907 A1* | 11/2013 | Ki | G06F 12/0684 711/170 |
| 2014/0244897 A1 | 8/2014 | Goss et al. | |
| 2014/0281280 A1 | 9/2014 | Goss et al. | |
| 2014/0289456 A1* | 9/2014 | Simha | G06F 11/141 711/103 |
| 2015/0210095 A1 | 7/2015 | Anzai | |
| 2015/0248366 A1 | 9/2015 | Bergsten et al. | |
| 2015/0254088 A1 | 9/2015 | Chou et al. | |
| 2015/0355971 A1 | 12/2015 | Becker-Szendy et al. | |

* cited by examiner

RESOURCE MONITORING IN A DISTRIBUTED STORAGE SYSTEM

PRIORITY CLAIM

This application claims priority to the following application(s), each of which is hereby incorporated herein by reference:

U.S. provisional patent application 62/288,106 titled "Congestion Mitigation ni a Distributed Storage System" filed on Jan. 28, 2016.

INCORPORATION BY REFERENCE

Each of the following documents is hereby incorporated herein by reference in its entirety:

U.S. patent application Ser. No. 14/789,422 titled "Virtual File System Supporting Multi-Tiered Storage" and filed on Jul. 1, 2015;

U.S. patent application Ser. No. 14/833,053 titled "Distributed Erasure Coded Virtual File System" and filed on Aug. 22, 2015;

U.S. patent application Ser. No. 15/041,123 titled "Congestion Mitigation in a Distributed Storage System" and filed on the same date as this application.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for congestion mitigation in a distributed storage system substantially as illustrated by and/or described in connection with at least one of the figures, as set forth more completely in the claims.

DETAILED DESCRIPTION

Figure 1:
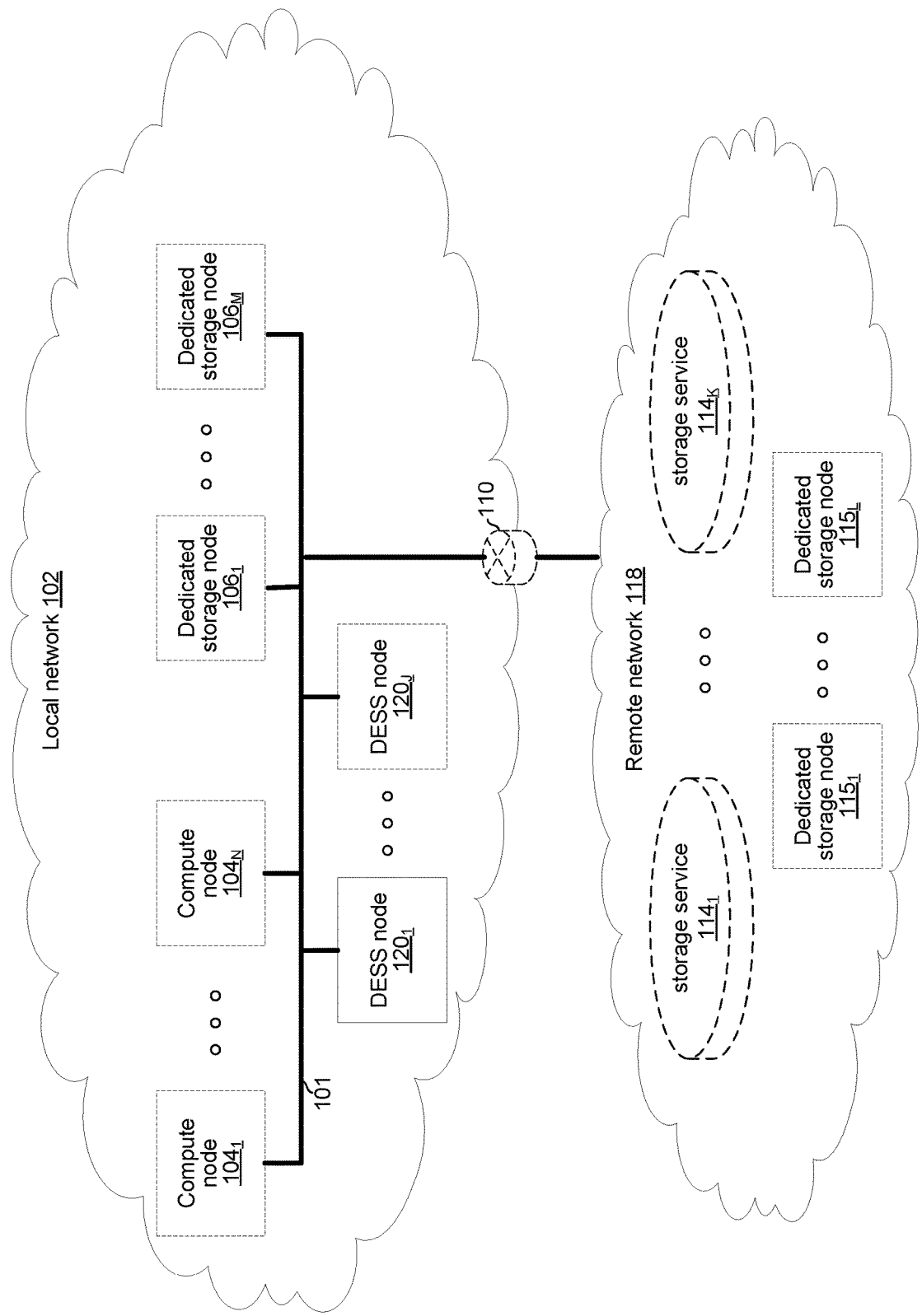
FIG. 1 illustrates various example configurations of a distributed electronic storage system (DESS) in accordance with aspects of this disclosure.

FIG. 1 illustrates various example configurations of a distributed electronic storage system in accordance with aspects of this disclosure. Shown in FIG. 1 is a local area network (LAN) 102 comprising one or more distributed electronic storage system (DESS) nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router 110 that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1). The nodes of the LAN 102 are communicatively coupled via interconnect 101 (e.g., copper cables, fiber cables, wireless links, switches, bridges, hubs, and/or the like).

Each compute node $104_n$ (n an integer, where 1≤n≤N) is a networked computing device (e.g., a server, personal computer, or the like) that comprises circuitry for running a variety of client processes (either directly on an operating system of the node $104_n$ and/or in one or more virtual machines/containers running on the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliably stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where 1≤j≤J) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DESS process" is a process that implements aspects of one or more of: the DESS driver, the DESS front end, the DESS back end, the DESS memory controller, the DESS administrator, the DESS provisioner, and the DESS logger/monitor described below in this disclosure (any one or more of which may implement one or more choking processes, as described below). Example configurations of a DESS node $120_j$ are described below with reference to FIG. 3. Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client processes. From the perspective of the client process(es), the interface with the DESS may be independent of the particular physical machine(s) on which the DESS process(es) are running Example configurations of a DESS node $120_j$ are described below with reference to FIG. 3.

Each on-premises dedicated storage node $106_m$ (m an integer, where 1≤m≤M) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where 1≤k≤K) may be a cloud-based service such as Amazon S3, Microsoft Azure, Google Cloud, Rackspace, Amazon Glacier, and Google Nearline.

Each remote dedicated storage node $115_l$ (l an integer, where 1≤l≤L) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
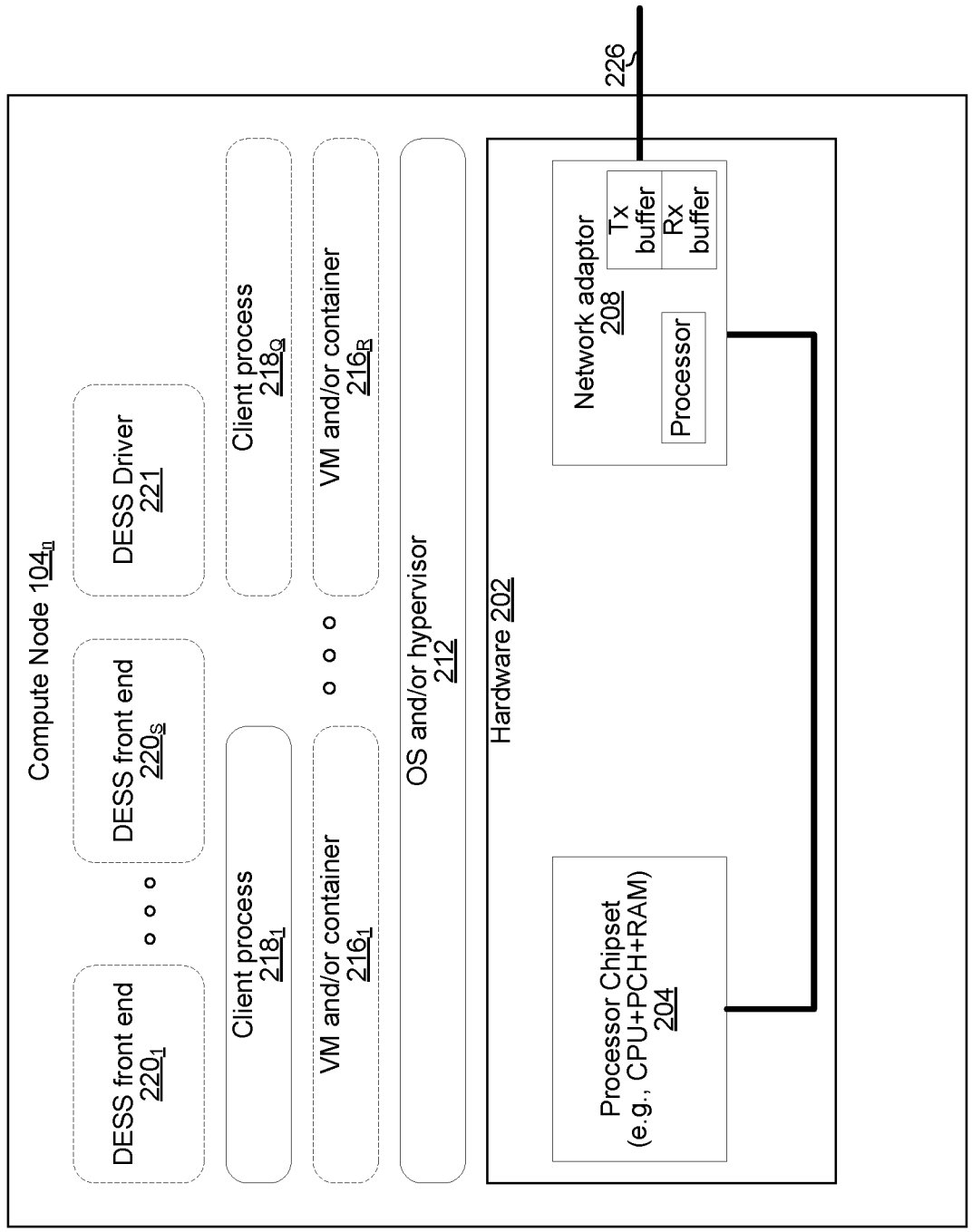
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 of compute node $104_n$ includes at least: an operating system and/or hypervisor 212, one or more client processes 218 (indexed by integers from 1 to Q, for Q≥1) and one or both of: a DESS driver 221 and DESS front end 220. Additional software that may optionally run on the compute node $104_n$ includes: one or more virtual machines (VMs) and/or containers 216 (indexed by integers from 1 to R, for R≥1).

Each client process $218_q$ (q an integer, where 1≤q≤Q) may run directly on an operating system/hypervisor 212 or may run in a virtual machine and/or container $216_r$ (r an integer, where 1≤r≤R) serviced by the OS and/or hypervisor 212.

The DESS driver 221 is operable to receive/intercept local file system commands (e.g., POSIX commands) and generate corresponding file system requests (e.g., read, write, create, make directory, remove, remove directory, link, etc.) to be transmitted onto the interconnect 101. In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (DMB), Common Internet File System (CIFS), and/or the like.

Each DESS front end instance $220_s$ (s an integer, where 1≤s≤S if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on the processor of chipset 204 or on the processor of the network adaptor 208. For a multi-core processor of chipset 204, different instances of the DESS front end 220 may run on different processing cores.

Figure 3:
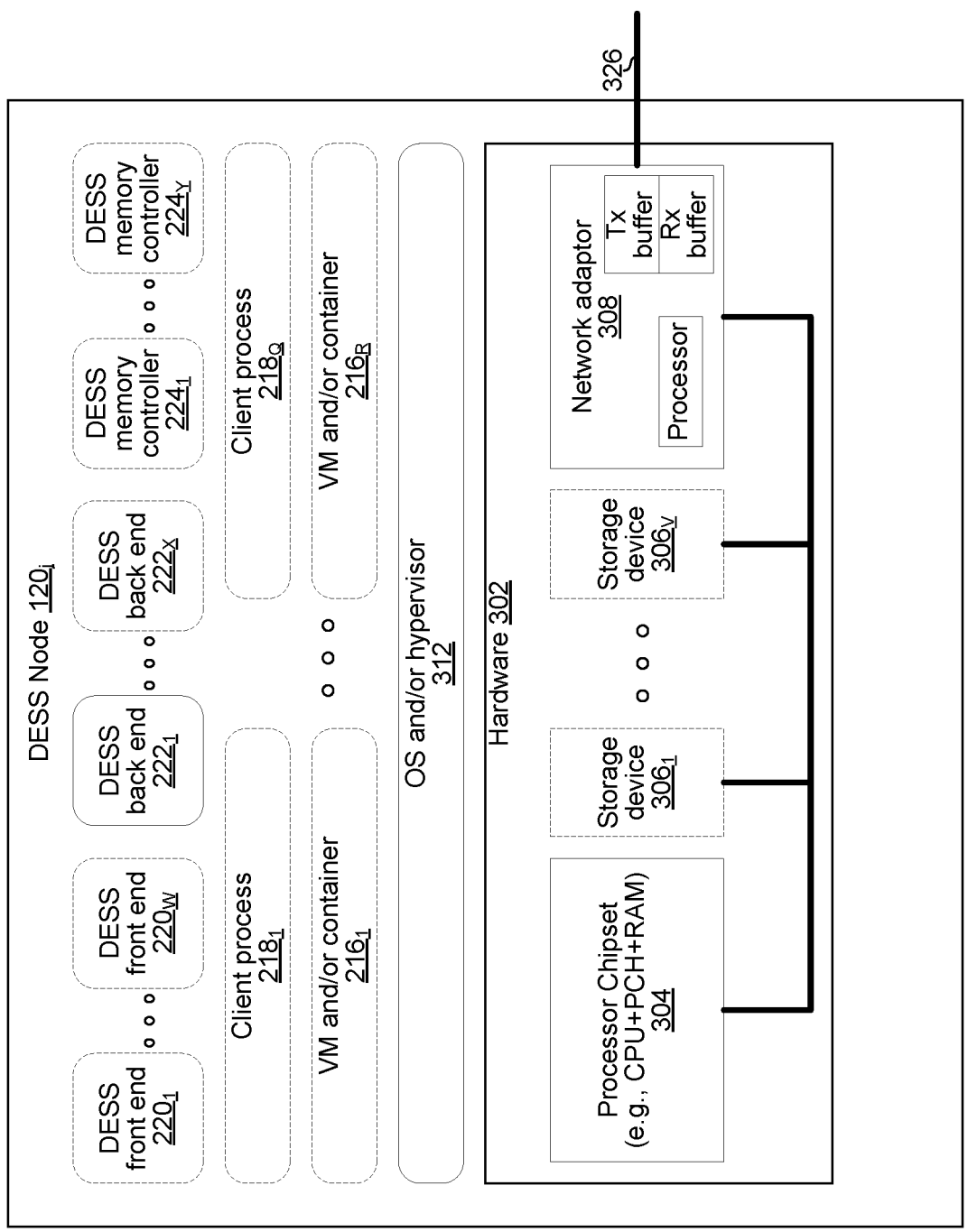
FIG. 3 illustrates various example configurations of a distributed electronic storage system node in accordance with aspects of this disclosure.

FIG. 3 shows various example configurations of a distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for W≥1).

Each storage device $306_p$ (p an integer, where 1≤p≤P if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for W≥1), one or more instances of DESS back end 222 (indexed by integers from 1 to X, for X≥1), and one or more instances of DESS memory controller 224 (indexed by integers from 1 to Y, for Y≥1). Additional software that may optionally run on the hardware 302 includes: one or more virtual machines (VMs) and/or containers 216 (indexed by integers from 1 to R, for R≥1), and/or one or more client processes 318 (indexed by integers from 1 to Q, for Q≥1). As mentioned above, DESS processes and client processes may share resources on a DESS node.

The client processes 218 and VM(s) and/or container(s) 216 are as described above with reference to FIG. 2.

Each DESS front end instance $220_w$ (w an integer, where 1≤w≤W, if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different processing cores.

Each DESS back end instance $222_x$ (x an integer, where $1 \le x \le X$, if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different processing cores.

Each DESS memory controller instance $224_u$ (u an integer, where $1 \le u \le U$, if at least DESS memory controller instance is present on DESS node $120_j$) handles interactions with a respective storage device 306 (which may reside in the DESS node 120j or another DESS node 120 or a storage node 106). This may include, for example, translating addresses, and generating the commands that are issued to the storage device (e.g., on a SATA, PCIe, or other suitable bus). Thus, the DESS memory controller instance $224_u$ operates as an intermediary between a storage device and the various DESS back end instances of the DESS.

Figure 4:
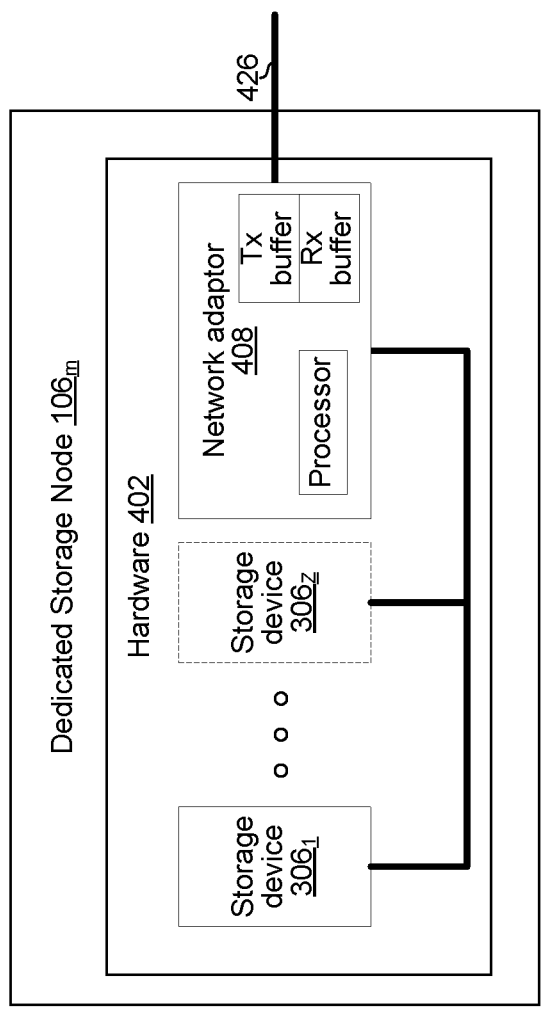
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for $Z \ge 1$). Each storage device $306_z$ may be the same as storage device $306_w$ described above with reference to FIG. 3. The network adaptor 408 may comprise circuitry (e.g., an ARM-based processor) and a bus (e.g., SATA, PCIe, or other) adaptor operable to access (read, write, etc.) storage device(s) $406_1$-$406_Z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory, and then migrated to one or more other tier(s) as dictated by data migration policies, which may be user-defined and/or adaptive based on machine learning.

Figure 5A:
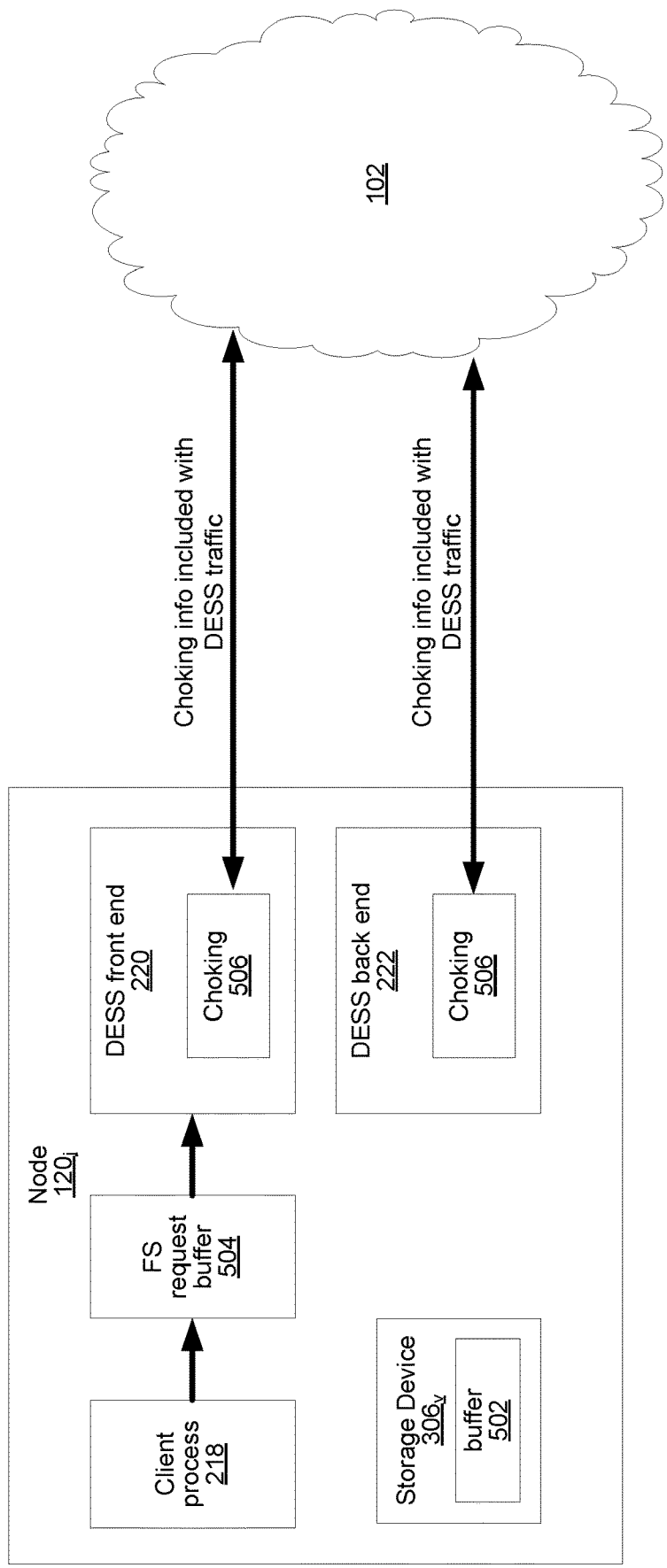
FIG. 5A illustrates an example implementation of a node configured for congestion mitigation in accordance with aspects of this disclosure.

FIG. 5A illustrates a first example implementation of a node configured for congestion mitigation in accordance with aspects of this disclosure. The example DESS node $120_l$ in FIG. 5A is configured to implement a client process 218, a file system request buffer 504, an instance of DESS front end 220, an instance of DESS backend 222, a storage device 306 comprising a buffer 502, and one or more file system choking process(es) 506.

The client process 218 may be as described above with reference to FIGS. 1-4. The client process 218 submits file system requests to the DESS and those file system requests are buffered in file system request buffer 504.

The file system request buffer 504 may, for example, reside in memory of the chipset 204 (FIG. 2). In the example implementation shown, the node $102_l$ comprises only a single buffer 504. In an example implementation in which the DESS comprises a plurality of distributed file systems which are mounted on the node $120_k$, the node $120_l$ may comprise a plurality of buffers 504—one for each of the mounted file systems.

The buffer 502 may, for example, comprise RAM within the storage device $306_v$. The buffer 502 is used for buffering data being read from and/or written to nonvolatile storage (e.g., FLASH) of the storage device 306.

The file system choking process(es) 506 control the rate at which the file system requests in the buffer 504 are fetched by the front end 220 so as to manage congestion in (and, thus, quality of service provided by) the DESS.

In operation, the front end fetches batches of file system requests from the buffer 504, determines which back end instance(s) 222 should service the request(s), generates the appropriate DESS message(s) for conveying the request(s) to the back end(s) 222, and transmits DESS message(s) to the determined back end(s) 222 via the network 102. The back end(s) 222 receive the DESS message(s) and perform the necessary operations to carry out the file system request (typically involving reading and/or writing data and/or metadata from/to one or more storage device(s) 306). The rate at which the file system requests are fetched from the buffer 504 is controlled by the choking process(es) 506. In an example implementation (further described below with reference to FIGS. 9A-9D), this comprises the choking process(es) 506 determining a choking level and then adjusting one or more settings based on the determined choking level. The one or more settings may comprise, for example: a batch timing setting (i.e., the timing of when file system requests are fetched from the buffer 504), and a batch size setting (i.e., how file system requests are fetched from the buffer 504 at a time). The batch timing setting may, for example, be an interval duration and/or an offset relative to some reference time.

The control of the rate at which file system requests are fetched may be based on information about the state of the DESS. The state information may be based on the load on (i.e., level of usage of) resources of the DESS. The load may be a most-recently measured/recorded load or may be a predicted load based on historical measurement/recordings (for the same DESS and/or other DESSs) being input to a prediction algorithm Such resources may include resources of the node $120_l$ (DESS resources "local" to node $120_l$). Such resources may also include similar resources of other nodes 104, $120_j$, and/or 106 of the DESS (DESS resources that are "remote" from the perspective of node $120_l$). Information about the loads on remote resources may be determined from DESS messages received from other nodes of the DESS. Similarly, the node $120_l$ may transmit DESS messages which indicate the loads on its resources. Such DESS messages may contain a direct representation of load on one or more resources and/or may contain values calculated based on the load no one or more resources. This bidirectional exchange of choking information gives choking processes 506 throughout the DESS a more holistic view of the state of the DESS, which enables them to more optimally control the rate at which they submit file system requests to the DESS as compared to if they had to control the rate based only on their respective local resource loads.

Resources for which resource load may be monitored include one or more of the following: storage device, CPU, network, and memory. A load on a storage device may, for example, be represented by a single value determined from depth of buffer 502, or represented by two values where the first is determined from depth of read buffer 710 and the second is determined from depth of write buffer 712. A load on a CPU may, for example, be represented by a value corresponding to a running average of percentage of available cycles per second being used. A load on a network adaptor or link may, for example, be represented by a single value determined from depth of transmit and/or receive buffers, or represented by two values where the first is determined from depth of a transmit buffer and the second is determined from depth of a receive buffer. A load on a memory may, for example, be represented by a single value determined from the amount of used (or free) memory.

Details of example operation of the implementation of FIG. 5A will now be described with reference to the flowchart of FIG. 5B.

Figure 5B:
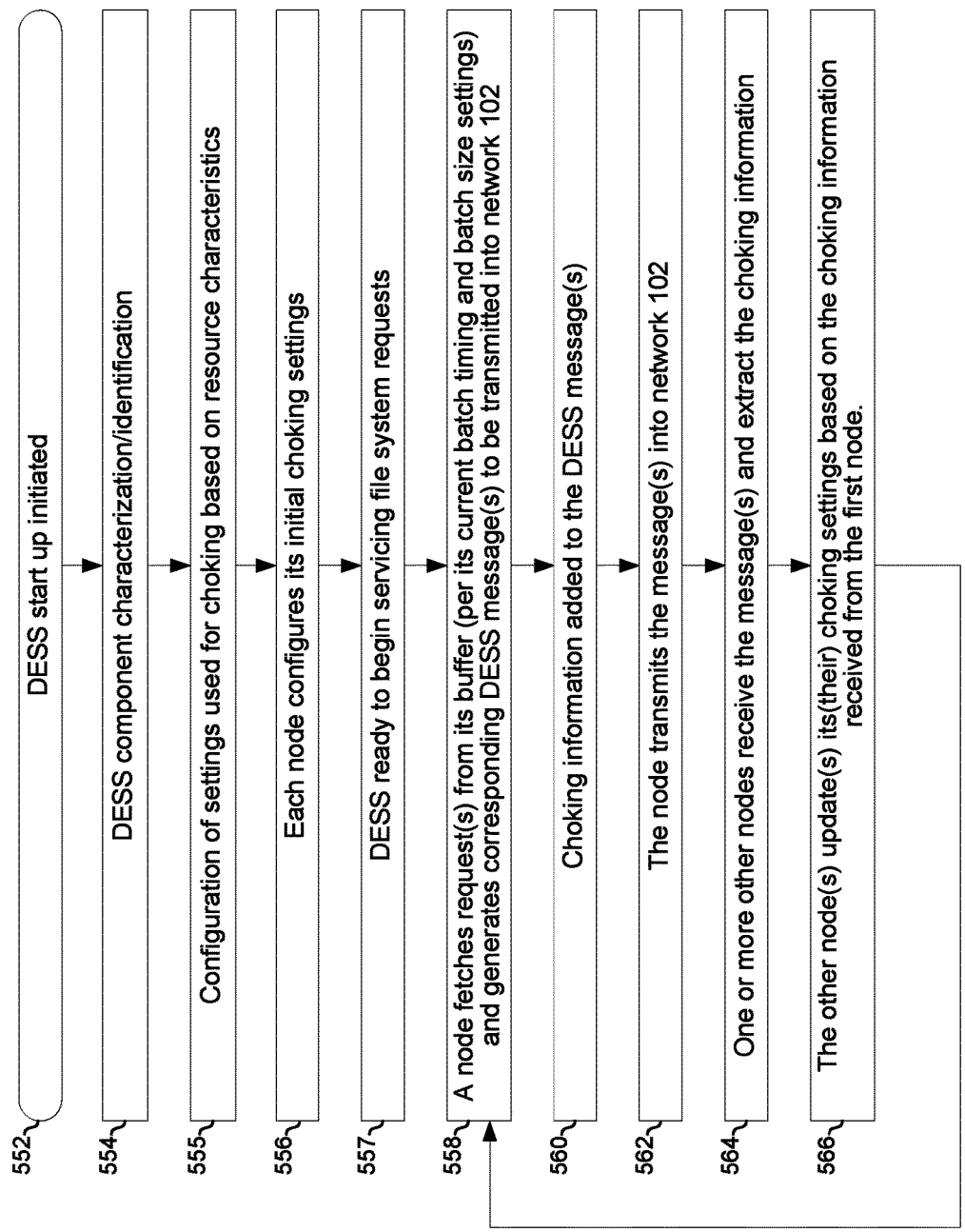
FIG. 5B is a flowchart illustrating an example process for congestion mitigation performed by the node of FIG. 5A.

The process of FIG. 5B begins with block 552 in which the DESS begins its startup/initialization process (e.g., after power up or reset of the node(s) across which it is distributed).

In block 554, various resources (e.g., CPU(s), memory, network adaptor(s), and storage device(s)) of the DESS are characterized. For example, a choking process 506 on each node of the DESS may determine (e.g., through one or more commands supported by the node's operating system) the identity (e.g., manufacturer, model number, serial number, and/or the like) of local resources, and use those identities to retrieve corresponding characteristics from a resource characteristics database (e.g., stored locally in the network 102 and/or accessible via the Internet). For a resource such as a CPU, such characteristics may include, for example, clock speed, cache size, cache speed, number of cores, and/or the like. For a resource such as memory, such characteristics may include, for example, size of memory, speed of memory, and/or the like. For a network adaptor such characteristics may include, for example, latency, maximum throughput, buffer size, and/or the like. For a resource such as a storage device such characteristics may include, for example, size of its buffer 502, write speed (e.g., in input/output operations per second (IOPS)) as a function of the depth (i.e., fill level) of its buffer 502, read speed as a function of the depth of its buffer 502, and/or the like. In instances that a record is not found in the database for an identified resource, a choking process 506 may perform a characterization of the resource before proceeding to block 556. As an example, test reads and/or writes may be issued to a storage device 306 and the resulting read and/or write speed as a function of the depth of its buffer 502 may be monitored and then used to generate a characterization which is then stored to the database.

In block 555, one or more settings used by the choking process(es) 506 are configured based on the resource characteristics determined in block 554. As an example, one or more functions may be used for mapping resource load values to congestion contribution values, mapping congestion contribution values to a choking level, and mapping a choking level to values for a batch timing setting and a batch size setting. Such function(s) may have one or more parameters which may be set based on the characteristics determined in block 554.

In block 556, each node of the DESS determines its initial choking settings (e.g., initial batch timing and batch size settings). The initial choking settings may, for example, be set empirically by a DESS administrator and/or may be set automatically by the choking process 506 based on historical settings used in this DESS and/or other DESSs (e.g., as adapted by a learning algorithm).

In block 557, the DESS is ready to begin servicing file system requests.

In block 558, a front end 220 of a DESS node $120_j$ (Note: the node $120_j$ may be a different node on different iterations through the loop comprising blocks 558-566) fetches file system request(s) from its buffer 504 based on its choking settings (e.g., values of batch timing and batch size), and generates one or more corresponding DESS message(s) (e.g., message(s) to convey the file system requests to the appropriate back end(s) 222).

In block 560, a choking process 506 of the node $120_j$ inserts choking information into the DESS message(s).

In block 562, the node $120_j$ transmits the DESS message(s) into the network 102.

In block 564, other node(s) of the DESS receive the DESS message(s) and extract(s) the choking information.

In block 566, the other node(s) update their choking settings based on the choking information from node $120_j$ and based on their most-recent load information for other resources.

Figure 6:
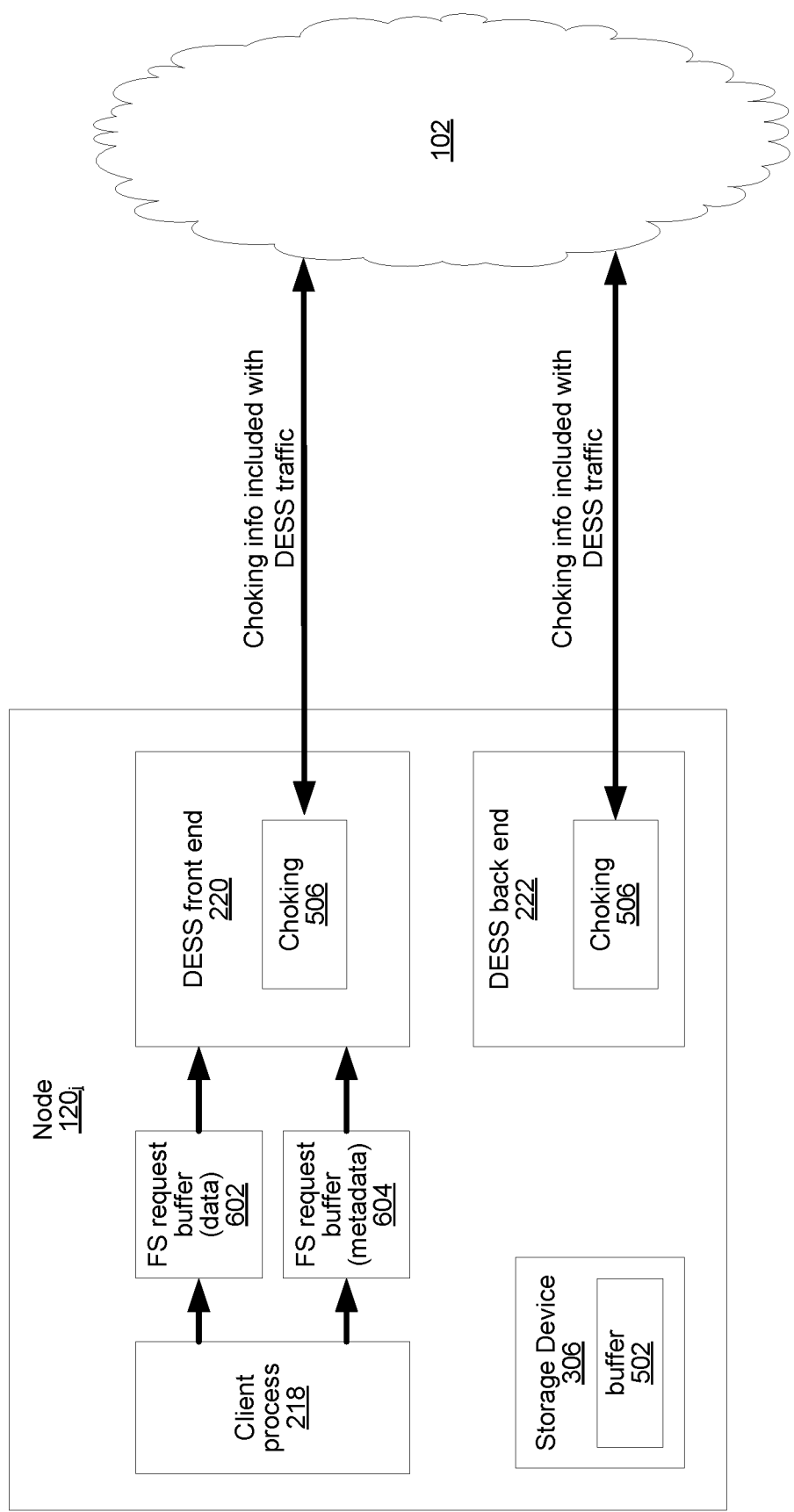
FIG. 6 illustrates another example implementation of a node configured for congestion mitigation in accordance with aspects of this disclosure.

FIG. 6 illustrates another example implementation of a node configured for congestion mitigation in accordance with aspects of this disclosure. FIG. 6 is largely the same as FIG. 5A except the node $120_j$ in FIG. 6 manages different types of file system requests separately. Specifically, file system requests which require reading and/or writing data to/from the distributed file system are managed separately from file system requests which require reading and/or writing metadata to/from the distributed file system. The separate management may be realized, for example, using two separate FIFO buffers 602 and 604 as shown, but may also be realized in other ways such as using a single random access buffer.

In the example implementation shown, the node $102_j$ comprises only a single buffer 602 and a single buffer 604. In an example implementation in which the DESS comprises a plurality of distributed file systems which are mounted on the node $120_j$, the node $120_j$ may comprise a plurality of buffers 602 (one for each file system of the DESS mounted on node $120_j$) and a plurality of buffers 604 (one for each file system of the DESS mounted on node $120_j$).

Operation of the example node $120_j$ of FIG. 6 is similar to as described with reference to FIG. 5A, with the rate at which requests are fetched from buffer 602 being controlled separately from rate at which requests are fetched from buffer 604. For example, choking process(es) 506 of node $120_j$ may control the rate at which file system data requests are fetched from buffer 602 by controlling a data batch timing setting ($T_D$) and a data batch size setting ($S_D$), and may control the rate at which file system metadata requests are fetched from buffer 604 by controlling a metadata batch timing setting ($T_M$) and a metadata batch size setting ($S_M$). The ability to separately control the rate of file system data requests and file system metadata requests is advantageous at least because, in many cases, file system metadata requests are more important than file system data requests because file system metadata requests enable, for example: querying the status of the DESS; making some changes so to optimize in-process file system operations. Further, metadata requests are often run by interactive "human generated" sessions, so getting them to execute quicker results in a higher level of user satisfaction. Accordingly, in some instances when the DESS is getting congested, the choking process(es) 506 may reduce the rate at which requests are fetched from buffer 602 sooner and/or more aggressively than the rate at which requests are fetched from buffer 604. In some instances this may lead to a scenario in which file system metadata requests, but not file system data requests, are fetched during a determined time interval.

Figure 7:
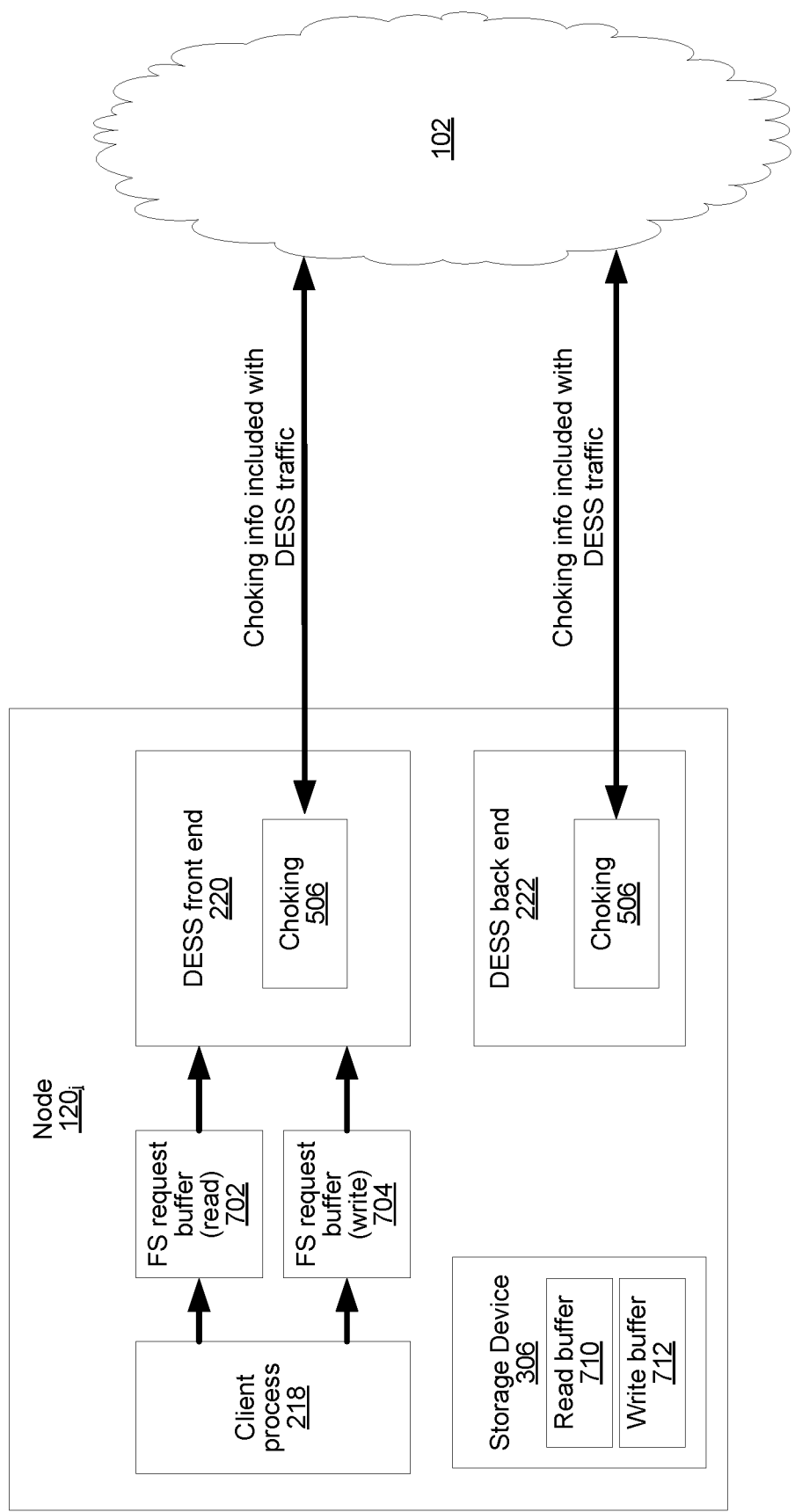
FIG. 7 illustrates another example implementation of a node configured for congestion mitigation in accordance with aspects of this disclosure.

FIG. 7 illustrates another example implementation of a node configured for congestion mitigation in accordance with aspects of this disclosure. FIG. 7 is largely the same as FIG. 6 except, in FIG. 7, the separate management is of file system read requests and file system write requests, rather than of file system data requests and file system metadata requests. The separate management may be realized, for example, using two separate FIFO buffers 702 and 704 as shown, but may also be realized in other ways such as using a single random access buffer.

In the example implementation shown, the node $102_i$ comprises only a single buffer 702 and a single buffer 704. In an example implementation in which the DESS comprises a plurality of distributed file systems which are mounted on the node $120_j$, the node $120_j$ may comprise a plurality of buffers 702 (one for each file system of the DESS mounted on node $120_j$) and a plurality of buffers 704 (one for each file system of the DESS mounted on node $120_j$).

Operation of the example node $120_j$ of FIG. 7 is similar to as described with reference to FIG. 6, with the rate at which requests are fetched from buffer 702 being controlled separately the rate at which requests are fetched from buffer 704. For example, choking process(es) 506 of node $120_j$ may control the rate at which file system data write requests are fetched from buffer 702 by separately controlling a write timing setting ($T_W$), a write batch size setting ($S_W$), a read timing setting ($T_R$), a read batch size setting ($S_R$), metadata batch timing setting ($T_M$), and a metadata batch size setting ($S_M$). The ability to separately control the rate of file system read requests and file system write requests is advantageous at least because, for example, write operations and read operations may use different resources which may become congested at different rates. For example, it may occur at some particular time that there are many read operations pending and thus buffer 710 of storage device 306 cannot accept any more read requests, but buffer 712 has capacity to accept write requests (and resources of the storage device 306 are available to begin working on such write requests). Without separate management of file system read requests and file system write requests, write requests in the buffer 504 (FIG. 5) may be blocked by read requests waiting for resources in storage device 306 to free up. Similarly, it may occur at some particular time that there are many write operations pending and thus buffer 712 of storage device 306 cannot accept any more write requests, but buffer 710 has capacity to accept read requests (and resources of the storage device 306 are available to begin working on such read requests). Without separate management of file system read requests and file system write requests, read requests in the buffer 504 (FIG. 5) may be blocked by read requests waiting for resources in storage device 306 to free up. The implementation of FIG. 7 avoids this problem and permits the DESS to begin working on one or more pending write requests.

Figure 8A:
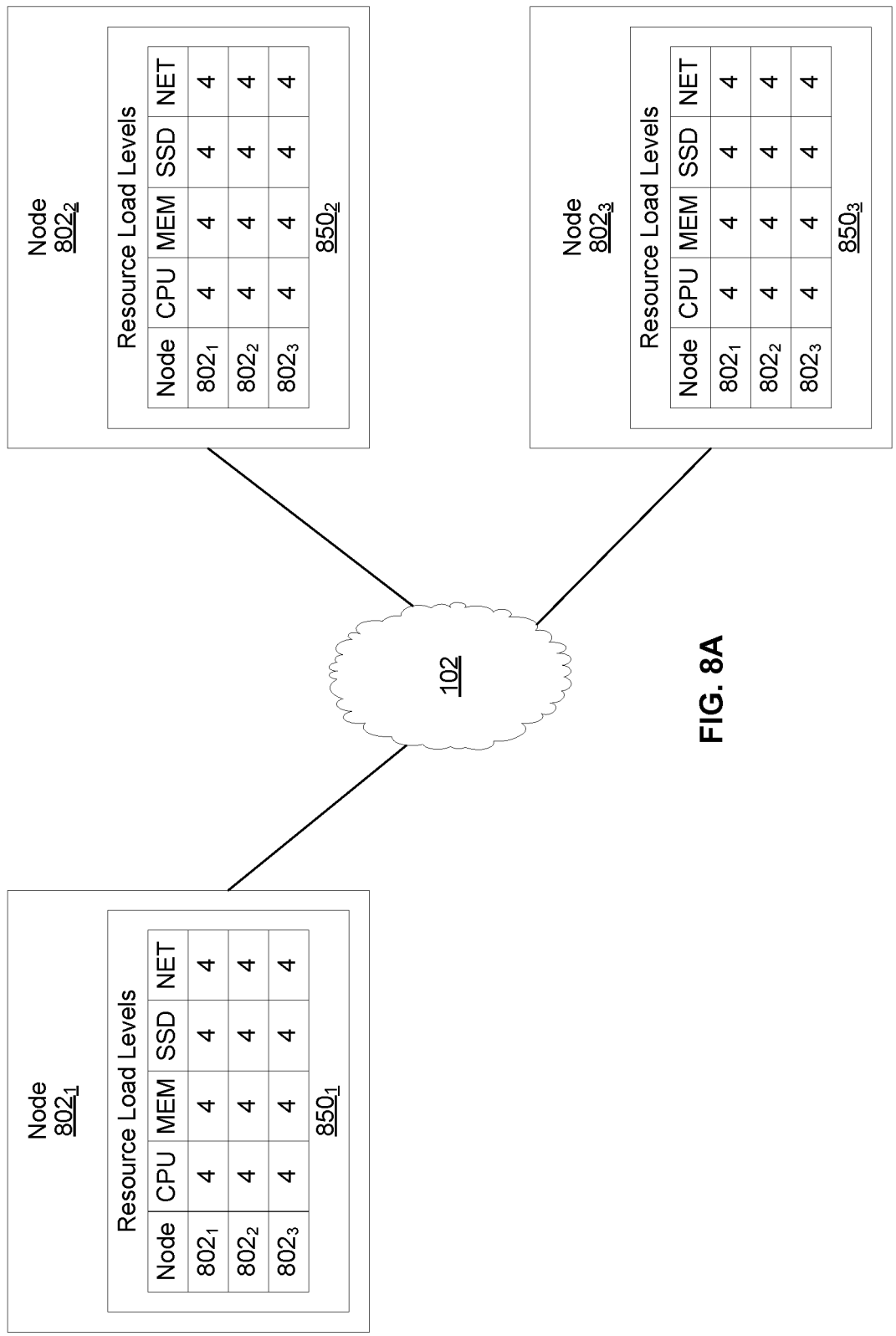
FIGS. 8A-8C illustrate an example initialization and update of resource load levels in a DESS, in accordance with aspects of this disclosure.
Figure 8B:
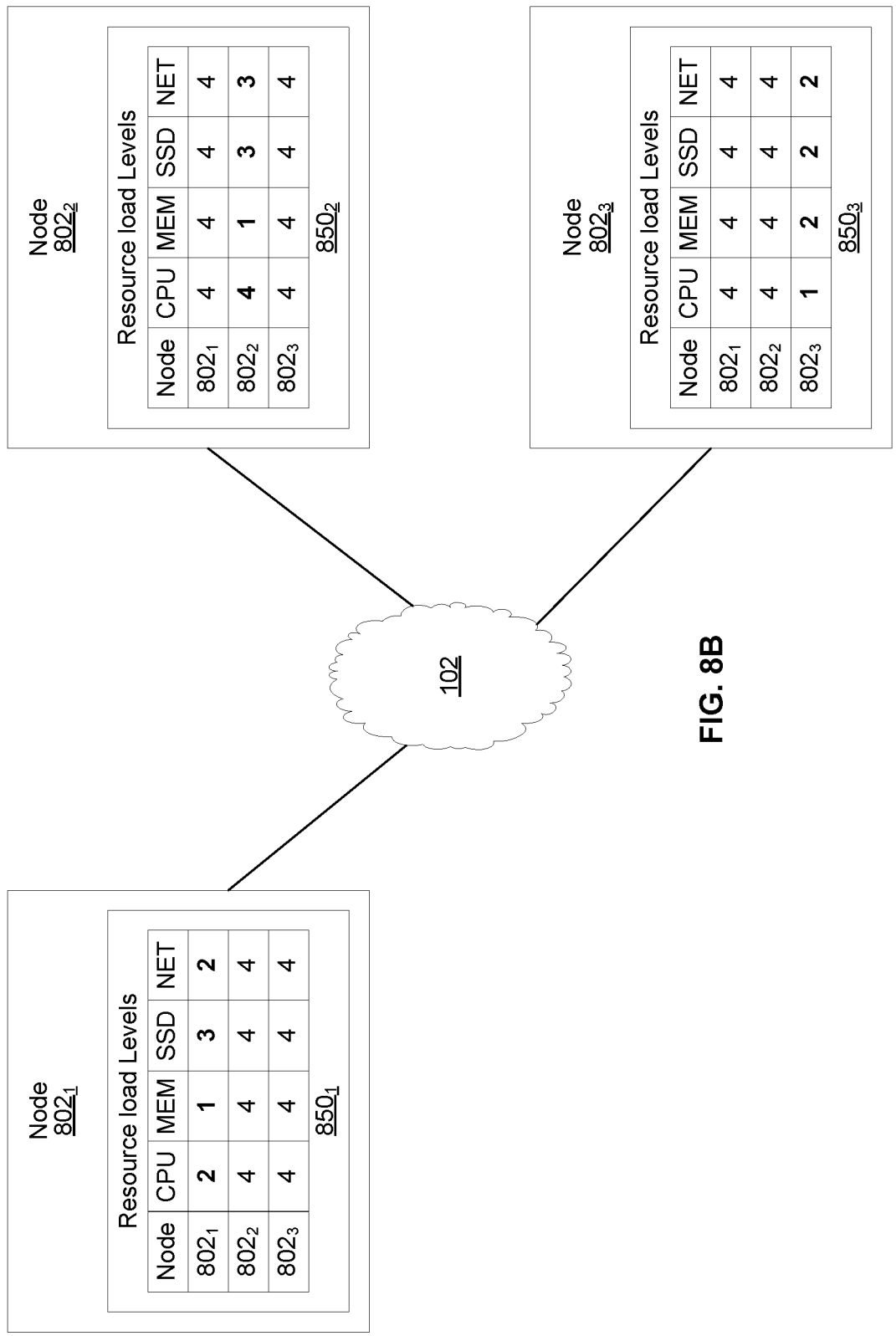
Figure 8C:
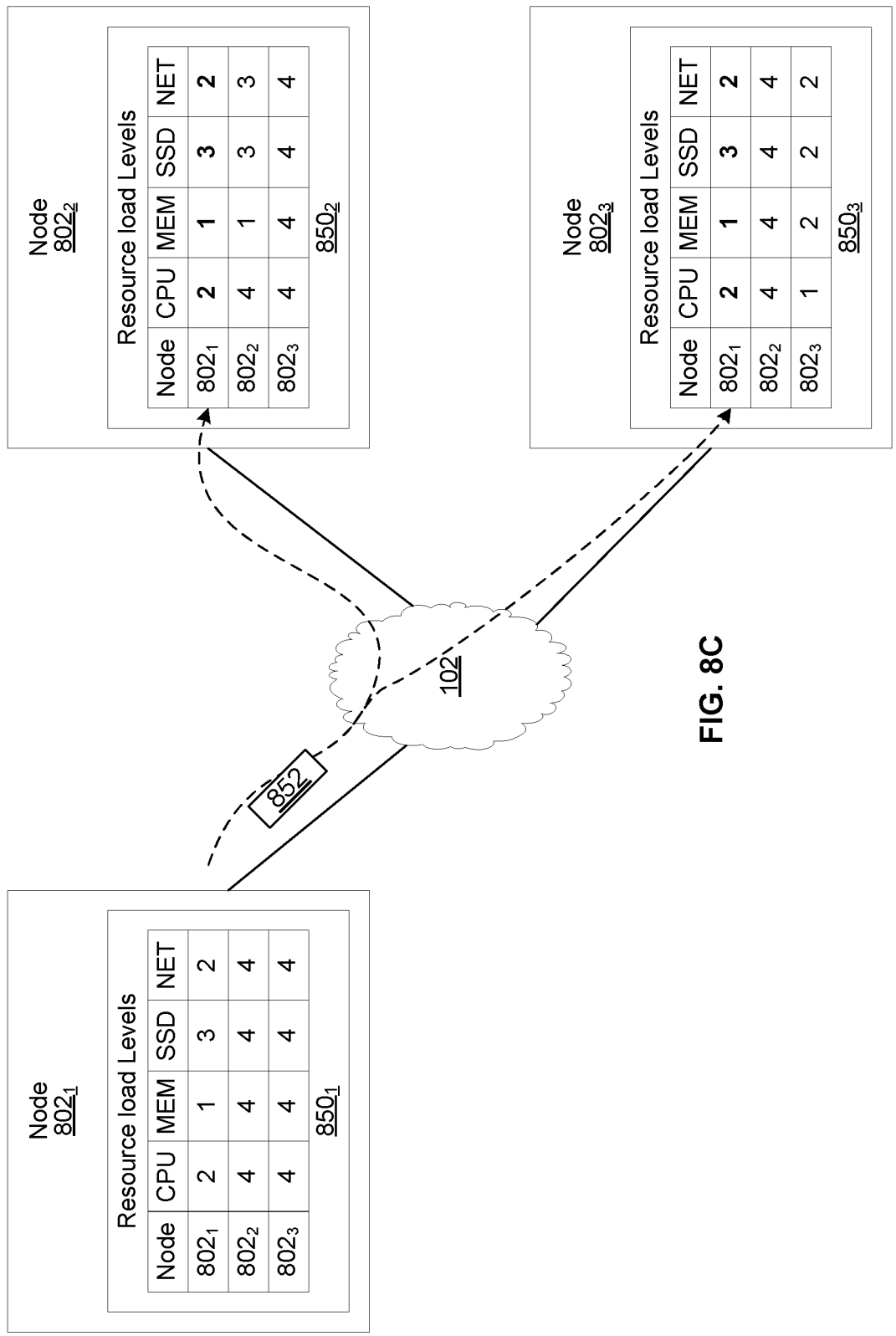

Now referring to FIGS. 8A-8C, there is shown three example nodes $802_1$-$802_3$ of a DESS. Each node $802_X$ (X between 1 and 3 in the example of FIGS. 8A-8C) may be a compute node 102, a DESS node 120, or a storage node 106. Each node $802_X$ comprises a data structure $850_X$ (e.g., in which is stored resource load values for resources, both local and remote, of the DESS. For purposes of illustration (and not limitation), the example of FIGS. 8A-8C assumes four resources are monitored: CPU resources, memory resources, storage (solid state drive (SSD) in the example, but could be any type of non-volatile storage) resources, and network resources. For purposes of illustration (and not limitation), each resource load value can range between 0 and 7. The load values may, for example, correspond to percentage of maximum load supported by the resource. The values may, for example, scale linearly (e.g., 25%, 37.5%, 50%, 62.5%, 75%, 87.5%, and 100%), nonlinearly (e.g., 20%, 40%, 60%, 75%, 85%, 90%, 95%, 100%, or in any other desired manner. The relationship between the values representing the load and the actual load (e.g., as a percentage of maximum capacity) may be configurable by a system administrator and/or may adapt during operation of the DESS (e.g., based on log files generated by the DESS logger/monitor, as described with reference to FIGS. 9-10).

For purposes of illustration (and not limitation), each data structure $850_X$ is shown as a table where each row corresponds to a respective one of nodes $802_1$-$802_3$, and each column corresponds to one of the monitored resources. Thus, for example, a '4' in row 1, column 1 indicates a load of '4' for CPU resources of node $802_1$, and a '2' in row 2, column 3 corresponds to a load of '2' for a storage device of node $802_2$.

FIG. 8A shows the nodes $802_1$-$802_3$ upon initialization of the DESS. In this example, in order for the DESS to begin servicing file system requests without having to wait for the loads on the various resources to be determined (which may be difficult to do without processing actual files system requests, or at least "dummy" file system requests), each node $802_X$ initializes its resource load table 850 to default values. For simplicity of illustration, it is assumed that '4' is the default value for all resources. In practice, different resources may default to different values and/or different nodes may use different default values. The default values may be configured by a network administrator and/or may adapt based on previous operation of the DESS (e.g., based on log files generated by the DESS logger/monitor, as described with reference to FIGS. 9-10).

Now referring to FIG. 8B, again shown are the nodes of FIG. 8A, but at a later time than in FIG. 8A. In FIG. 8B, each node $802_X$ has determined the load its local resources. Thus, each node $802_X$ has updated row X of its data structure $850_X$. In an example implementation, determination of the load on local resources may comprise file system choking process(es) of the nodes $802_X$ querying their respective OSs/hypervisors.

Now referring to FIG. 8C, again shown are the nodes of FIG. 8B but at a later time than FIG. 8B. In FIG. 8C, when node $802_1$ has a file system message 852 to transmit into the network 102. The $802_1$ inserts resource load information into the message. The node $802_1$ may, for example, insert row 1 of table $850_1$ into the message 852 or may, for example, insert its whole table $850_1$ into the message 852 (thus propagating other updates it may have received). The file system message 852 may, for example, be a message delivering a file system request received by a DESS front end instance 220 (see e.g., FIGS. 5A and 5B) on node $802_1$ to the back end instance 222 (see e.g., FIGS. 5A and 5B) that will service the request. In the example shown, the message 852 is sent as a broadcast message such that each other node $802_X$ receives the message and updates row 1 of its table $850_X$. In another example implementation, the message 852 may be a unicast message but nodes to which the message is not destined may nevertheless "sniff" the message to extract a field of the message used for carrying resource load information. In another example implementation, the message 852 may be a unicast message and the resource load information carried therein may only be received by the device to which the message is destined. In such an implementation, only the one of nodes $802_2$ and $802_3$ to which the message 852 is destined will update row 1 of its table 850 based on this message. The other one of the nodes $802_2$ and $802_3$ will have to wait for a file system message directed to it (from either $802_1$ or the other node which has received the update) in order to receive the updated load values for node $802_1$. In practice, with many file system messages being exchanged frequently, updates may propagate through the DESS quickly such that any particular table $850_X$ will typically not contain many stale values and/or not contain a stale value for very long.

In the example just described, resource load values are "piggybacked" on file system messages which would be sent anyways (even if there was no resource load information to convey). This reduces resources required for communicating the resource load information. In some instances, however, file system messages may be generated and sent for the sole purpose of updating resource load values. For example, dedicated resource load value messages may be generated upon initialization of the DESS so as to reduce the reliance on default values. As another example, a dedicated resource load value message may be generated and sent in response to detecting that one or more load values have not been updated in more than a threshold amount of time (e.g., row 3 of table $850_1$ may be determined stale if it has not been updated for more than the threshold amount of time, and a dedicated message carrying a more-recently updated row 3 from either table $850_2$ or $850_3$ may be communicated to the node $802_1$).

Figure 9:
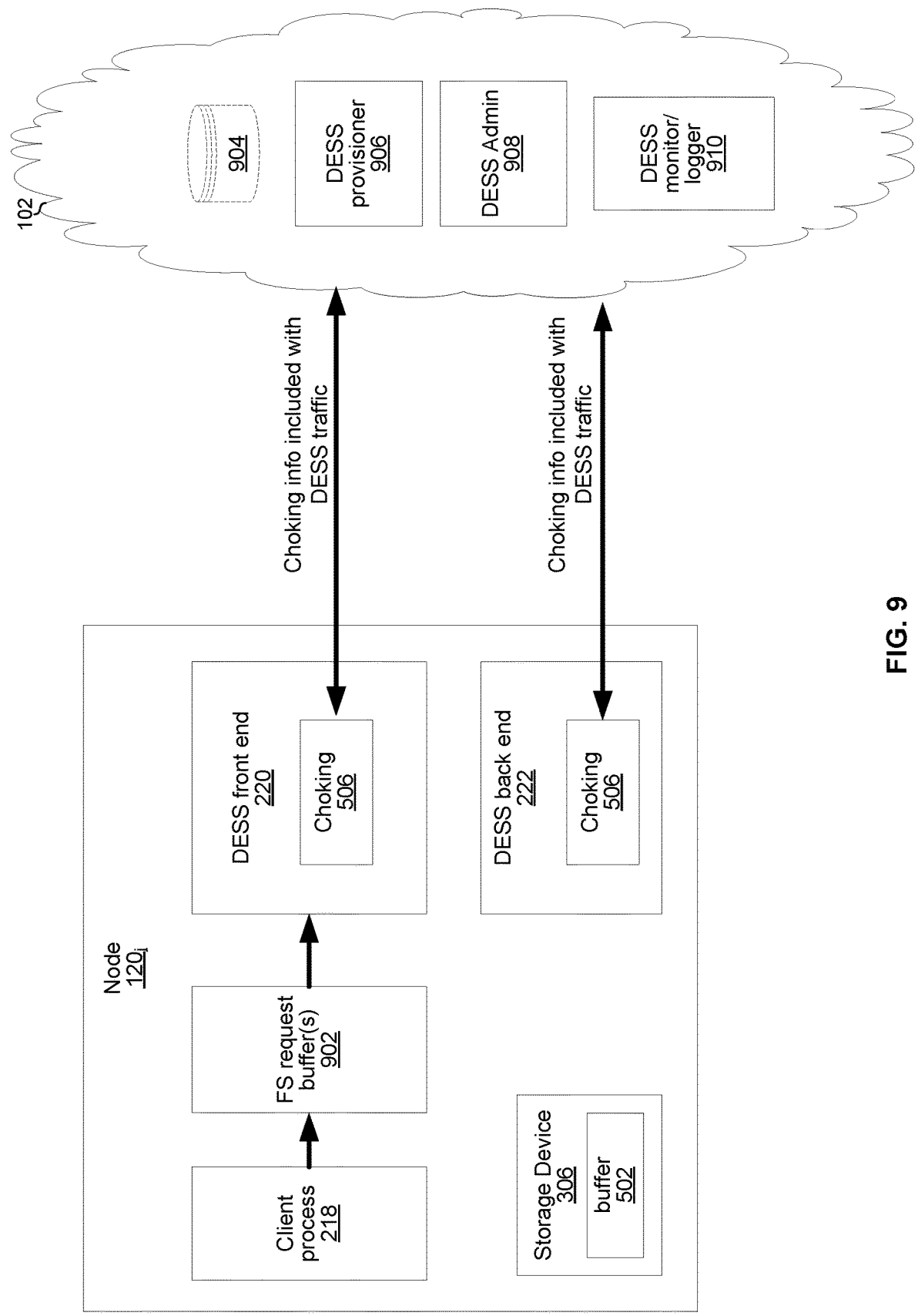
FIG. 9 illustrates aspects of a DESS configured to perform resource load monitoring.

FIG. 9 illustrates aspects of a DESS configured to perform resource load monitoring. The node $120_j$ shown in FIG. 9 is similar to the node $120j$ shown in FIGS. 5A, 6, and 7 with the FS request buffer(s) 902 providing any desired buffering scheme such as any of the buffering schemes described above with reference to FIGS. 5A, 6, and 7. In FIG. 9 one or more DESS nodes are configured to implement a database 904, a DESS provisioner 906, a DESS administrator 908, and a DESS monitor/logger 910.

The DESS monitor/logger 910 is operable to monitor performance of the DESS. This may comprise, for example, processing file system messages being communicated among the nodes of the DESS to extract information indicative of the load on DESS resources and/or performance of the DESS. For example, the monitor/logger 910 may extract resource load values, such as those described above with reference to FIGS. 8A-8C, from the file system messages and log these values (and/or metadata associated with the values) to the database 904. As another example, the monitor/logger 910 may track how long file system requests (e.g., particular requests and/or on average) are taking to complete and log this information to the database. In an example implementation, the DESS comprises a single DESS monitor/logger 910 which monitors all resources of the DESS (e.g., by "sniffing" all file system messages communicated among the nodes of the DESS). Such an implementation is shown in FIG. 9. In FIG. 9 DESS monitor/logger 910 resides in a node other than $120_j$ for clarity of illustration, but it could have been shown as residing in the node $120_j$. In another example implementation, each node of the DESS may comprise its own DESS monitor/logger 910 responsible for monitoring local resources of that node and logging the information to the database 904.

The DESS provisioner 906 is operable to provision (and deprovision) resources of one or more computing devices for use by the DESS. Provisioning and deprovisioning of resources may be performed based on the current and/or predicted load on resources provisioned for use by the DESS. The current load on provisioned resources may be determined from, for example, output (e.g., log files) of the DESS monitor/logger 910. The predicted load may, for example, be generated using a learning algorithm and historical resource load data (i.e., log files from monitor/logger 910). In an example implementation, the DESS comprises a single/centralized DESS provisioner 906 operable to perform provisioning and deprovisioning of resources across the entire DESS. Such an implementation is shown in FIG. 9. In FIG. 9 DESS provisioner 906 resides in a node other than $120_j$ for clarity of illustration, but it could have been shown as residing in the node $120_j$. Alternatively (or additionally), each node of the DESS may comprise its own DESS provisioner 910 operable to perform provisioning and deprovisioning of local resources.

The DESS administrator 908 is operable to provide a user interface via which a DESS administrator can monitor the DESS. For example, the DESS administrator 908 may provide an application programming interface via which some data about the state of the DESS (e.g., log files and/or real time output generated by the DESS monitor/logger 910 and/or the DESS provisioner 906) can be retrieved/visualized/etc. In FIG. 9 DESS provisioner 906 resides in a node other than $120_j$ for clarity of illustration, but it could have been shown as residing in the node $120_j$. Alternatively (or additionally), each node of the DESS may comprise its own DESS administrator 908 via which an administrator can interact with the DESS.

The database 904 may reside on storage devices 306 of the DESS and may store data generated by monitor/logger 910 (e.g., log files), data generated by provisioning agent 906 (e.g., reports of provisioning and de-provisioning actions undertaken), and data generated by the DESS administrator 908 (e.g., log files).

Figure 10:
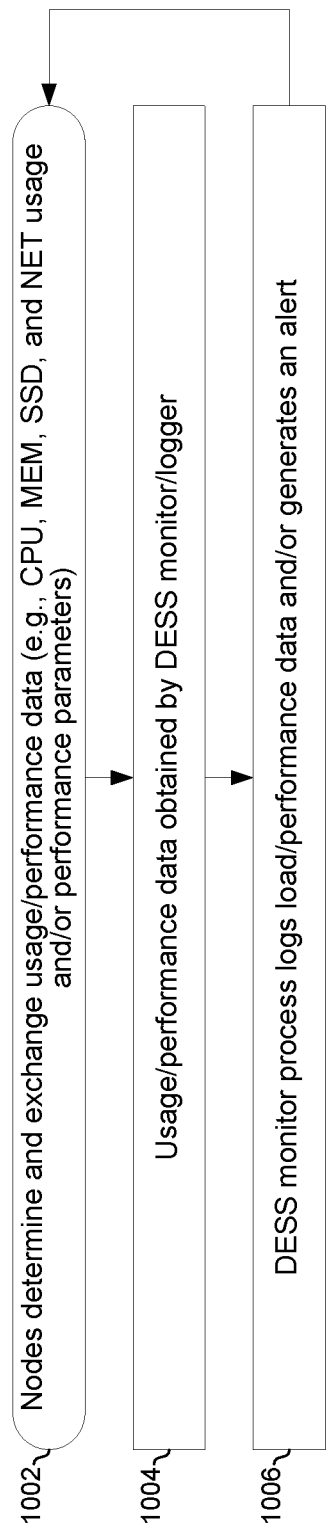
FIG. 10 is a flowchart illustrating an example process of resource load logging and reporting in a DESS.

FIG. 10 is a flowchart illustrating an example process of resource load logging and reporting in a DESS. The process of FIG. 10 may be performed continually, periodically, and/or occasionally (e.g., triggered by the occurrence of monitored-for events).

In block 1002, one or more choking processes 506 generate data indicating a load on, and/or performance of, resources provisioned for use by the DESS. In block 1004, the data generated in block 1004 is obtained by the DESS monitor/logger 910 (e.g., reported to the DESS monitor/logger 910 and/or "sniffed" as it is communicated across the network 102). In block 1006, the DESS monitor/logger 910 logs the data. In some instances, the DESS monitor/logger 910 compares the data against determined criteria to decide whether an alert should be generated. The alert may be, for example, an email or SMS message. Some examples of such criteria comprise: load on a particular resource being above a threshold, load on a particular resource being below a threshold, a DESS performance metric (e.g., file system IOPS) being below a threshold, a DESS performance metric (e.g., IOPS) being above a threshold, and/or the like.

Figure 11:
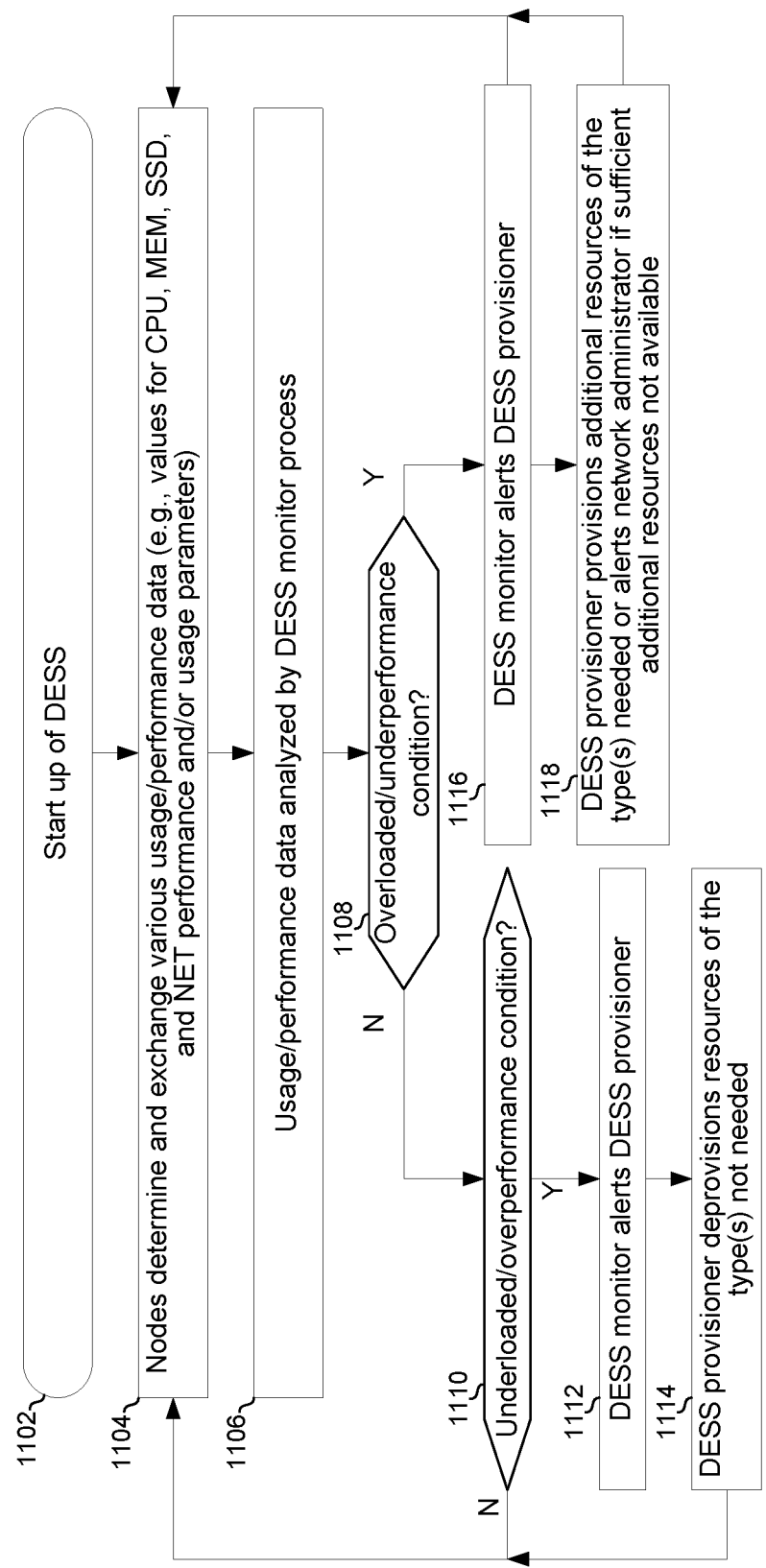
FIG. 11 is a flowchart illustrating an example process for automatic provisioning and de-provisioning of DESS resources.

FIG. 11 is a flowchart illustrating an example process for automatic provisioning and de-provisioning of DESS resources. The process begins with startup of the DESS in block 1102.

In block 1104, nodes of the DESS determine and exchange various load and/or performance data (e.g., resource load values, measured performance metrics, and/or the like). After block 1104, the process advances to block 1106.

In block 1106, the load and/or performance data is analyzed by DESS monitor/logger 910. After block 1106, the process advances to block 1108.

In block 1108, the DESS monitor/logger 910 determines whether an overloaded condition and/or an underperformance condition is present. The conditions tested for may adapt over time (e.g., based on log files generated by DESS monitor/logger 910). An example overloaded condition is a load on one or more resources provisioned for use by the DESS being greater than a determined threshold. An example underperformance condition is file system IOPS being below a determined threshold. If not, then the process advances to block 1110.

In block 1110, the DESS monitor/logger 910 determines whether an underloaded condition and/or an overperformance condition is present. The conditions tested for may adapt over time (e.g., based on log files generated by DESS monitor/logger 910). An example underloaded condition is a load on one or more resources provisioned for use by the DESS being less than a determined threshold. An example overperformance condition is file system IOPS being above a determined threshold. If not, then the process advances to block 1104.

Returning to block 1110, if an underloaded or overperformance condition is present, the process advances to block 1112.

In block 1112, the DESS monitor/logger 910 alerts DESS provisioner 906 as to the presence of the underloaded and/or overperformance condition.

In block 1114, DESS provisioner 906 determines which resources are no longer needed (e.g., by inspecting a log file generated by DESS monitor/logger 910), and de-provisions the unnecessary resources. As an example, if fewer CPU resources can be tolerated, the provisioner 906 may deallocate a CPU core such that the CPU core can be reallocated to performing other non-DESS functions. As another example, if less network bandwidth can be tolerated, the provisioner 906 may reduce the priority of DESS traffic in a network adaptor. The type(s) and/or amount of resources deprovisioned in block 1114 may, for example, be determined by the conditions present in block 1110 (e.g., based on the type of resource being underloaded, the amount by which load on the resource is below a threshold, and/or the like). The type(s) and/or amount of resources deprovisioned in block 1114 may, for example, be determined using machine learning algorithms based on the logs generated by logger/monitor 910.

Returning to block 1108, if an overloaded and/or underpeformance condition is present, the process advances to block 1116.

In block 1116, the DESS monitor/logger 910 alerts DESS provisioner 906 as to the presence of the overloaded and/or underperformance condition.

In block 1118, DESS provisioner 906 determines which additional resources are needed (e.g., by inspecting a log file generated by DESS monitor/logger 910), and provisions the necessary resources (if available). If the necessary resources are not available, an administrator may be alerted (e.g., via email, SMS, and/or the like). As an example, if CPU resources are being overburdened, the provisioner 906 may allocate an additional CPU core to performing DESS functions. As another example, if more network bandwidth is needed, the provisioner 906 may increase the priority of DESS traffic in a network adaptor. The type(s) and/or amount of resources provisioned in block 1118 may, for example, be determined by the conditions present in block 1108 (e.g., based on the type of resource being overburdened, the amount by which load on the resource is above a threshold, and/or the like). The type(s) and/or amount of resources provisioned in block 1118 may, for example, be determined using machine learning algorithms based on the logs generated by logger/monitor 910.

Figure 12:
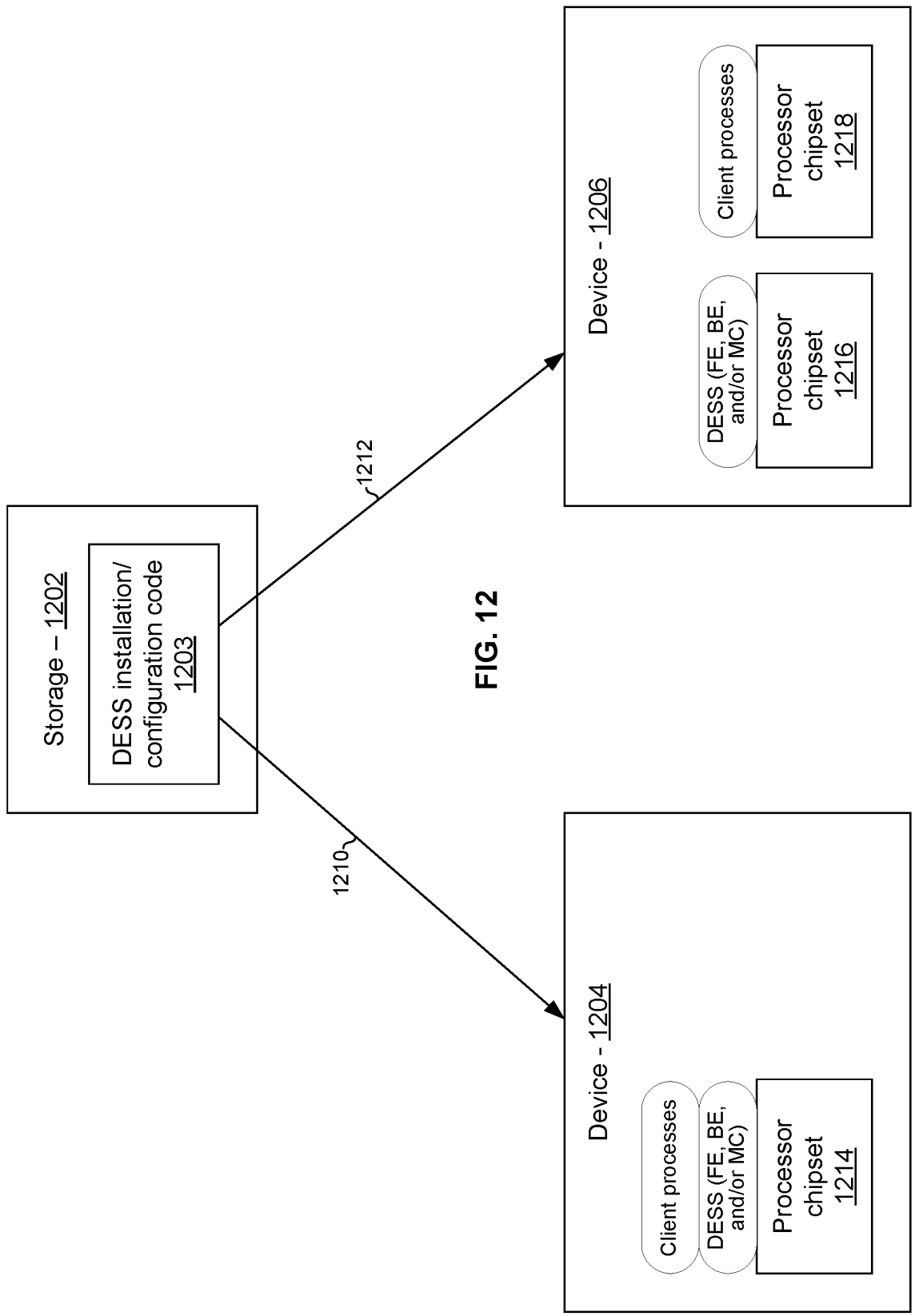
FIG. 12 is a block diagram illustrating configuration of a DESS from a non-transitory machine-readable storage media.

FIG. 12 is a block diagram illustrating configuration of a DESS from a non-transitory machine-readable storage media. Shown in FIG. 12 is non-transitory storage 1202 on which resides code 1203. The code is made available to computing devices 1204 and 1206 (which may be compute nodes, DESS nodes, and/or dedicated storage nodes such as those discussed above) as indicated by arrows 1210 and 1212. For example, storage 1202 may comprise one or more electronically addressed and/or mechanically addressed storage devices residing on one or more servers accessible via the Internet and the code 1203 may be downloaded to the devices 1004 and 1006. As another example, storage 1202 may be an optical disk or FLASH-based disk which can be connected to the computing devices 1204 and 1206 (e.g., via USB, SATA, PCIe, and/or the like).

When executed by a computing device such as 1204 and 1206, the code 1203 may install and/or initialize one or more of the DESS driver, DESS front-end, DESS back-end, DESS memory controller on the computing device. This may comprise copying some or all of the code 1203 into local storage and/or memory of the computing device(s) 1204 and/or 1206 and beginning to execute the code 1203 (launching one or more DESS processes) by one or more processors of the computing device(s) 1204 and/or 1206. Which of code corresponding to the DESS driver, code corresponding to the DESS front-end, code corresponding to the DESS back-end, and/or code corresponding to the DESS memory controller is copied to local storage and/or memory of the computing device(s) 1204 and/or 1206 and is executed by the computing device(s) 1204 and/or 1206 may be configured by a user during execution of the code 1203 and/or by selecting which portion(s) of the code 1203 to copy and/or launch. In the example shown, execution of the code 1203 by the device 1204 has resulted in one or more client processes and one or more DESS processes being launched on the processor chipset 1214. That is, resources (processor cycles, memory, etc.) of the processor chipset 1214 are shared among the client processes and the DESS processes. On the other hand, execution of the code 1203 by the device 1206 has resulted in one or more DESS processes launching on the processor chipset 1216 and one or more client processes launching on the processor chipset 1218. In this manner, the client processes do not have to share resources of the processor chipset 1216 with the DESS process(es). The processor chipset 1218 may comprise, for example, a process of a network adaptor of the device 1206.

In accordance with an example implementation of this disclosure, a distributed electronic storage system (DESS) comprises a plurality of computing devices (e.g., $120_1$-$120_J$) communicatively coupled via one or more network links and having a file system distributed among them. The DESS comprises management circuitry (e.g., circuitry configured to implement one or more of: choking process(es) 506, DESS provisioner, DESS administrator, and DESS monitor/logger) that resides on the first computing device. The management circuitry is operable to generate an indication of a load on a first resource that resides on the first computing device. The management circuitry is operable to receive, via the one or more network links, an indication of a load on a second resource that resides on a second computing device of the plurality of computing devices. The management circuitry is operable to determine a condition of the DESS based on the indication of the load on the first resource and the indication of the load on the second resource. The management circuitry may be operable to, subsequent to generation of the indication of the load on the first resource, append the indication of the load on the first resource to an outgoing file system message (e.g., 852), and transmit the file system message on to the one or more network links. The management circuitry may be operable to, in response to the condition of the DESS being an overloaded condition, perform automatic provisioning of additional resources of the first computing device for use by the DESS. The automatic provisioning of additional resources may comprise one or more of: automatic provisioning of an additional processing core for use by the DESS; automatic provisioning of additional memory for use by the DESS; automatic provisioning of additional network bandwidth for use by the DESS; and automatic provisioning of additional nonvolatile storage for use by the DESS. The management circuitry may be operable to, in response to the condition of the DESS being an underloaded condition, perform automatic deprovisioning of resources of the first computing device which were previously provisioned for use by the DESS. The automatic deprovisioning of resources may comprise one or more of: automatic deprovisioning of a processing core previously provisioned for use by the DESS; automatic deprovisioning of memory previously provisioned for use by the DESS; automatic deprovisioning of network bandwidth previously provisioned for use by the DESS; and automatic deprovisioning of nonvolatile storage previously provisioned for use by the DESS. The indication of the load on the first resource and the indication of the load on the second resource may comprise one of: an indication of a load on a network link; an indication of a load on a processing core; an indication of a load on memory; and an indication of a load on a storage device. Each of the indication of the load on the first resource and the indication of the load on the second resource may comprise one or both of: an indication of a number of write operations pending for the file system; and an indication of a number of read operations pending for the file system. The first resource may be a storage device (e.g., 306) and the indication of the load on the first resource is based on a depth of a buffer of the storage device. One or more file system request buffers (e.g., 902) may reside on the first computing device. The management circuitry may be operable to control a rate at which file system requests stored in the one or more file system buffers are serviced. The control of the rate may be based on the determined condition of the DESS. The control of the rate may comprise control of one or both of: an interval at which batches of file system requests are fetched from the one or more buffers; and a size of each of the batches of file system requests. The control of the rate may comprise separate control of: a rate at which file system data requests stored in the one or more buffers are serviced; and a rate at which file system metadata requests stored in the one or more buffers are serviced. The control of the rate may comprise separate control of: a rate at which file system data read requests stored in the one or more buffers are serviced; and a rate at which file system data write requests stored in the one or more buffers are serviced. The determination of the status of the DESS may comprise calculation of a choking level which determines a rate at which requests of the file system are serviced. The management circuitry may be operable to generate an indication of a performance of the DESS, and determine a condition of the DESS based on the indication of the performance of the DESS. The management circuitry may be operable to, in response to the condition of the DESS being an underperformance condition, perform automatic provisioning of additional resources of the first computing device for use by the DESS. The management circuitry may be operable to, in response to the condition of the DESS being an overperformance condition, perform automatic deprovisioning of resources of the first computing device which were previously provisioned for use by the DESS.

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable storage medium (e.g., FLASH drive(s), optical disk(s), magnetic storage disk(s), and/or the like) having stored thereon one or more lines of code executable by a computing device, thereby configuring the machine to be configured to implement one or more aspects of the methods and systems described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. One or more non-transitory machine-readable storage medium having code stored thereon, that, when executed causes a first computing device to manage a distributed electronic storage system (DESS), wherein said management comprises:
 generating, via a first network adapter, an indication of a load on a first set of one or more resources that reside on said first computing device, wherein said first set of one or more resources comprises said first network adapter operable to store DESS traffic in a virtual container;

receiving, via one or more network links, an indication of a load on a second set of one or more resources that reside on a second computing device, wherein said second set of one or more resources comprises a second network adapter operable to store DESS traffic;

receiving an indication of a performance over said one or more network links;

determining a condition of said DESS based on said performance over said one or more network links, said indication of said load on said first set of one or more resources and said indication of said load on said second set of one or more resources, wherein said first computing device is operable to determine said condition as an underloaded condition and said first computing device is operable to determine said condition as an overperformance condition, and wherein said condition is adaptable over time according to a log file generated by a monitor on said first computing device, and wherein said second computing device is operable to determine said condition of the DESS based on said load on said first set of one or more resources that reside on said first computing device and said load on said second set of one or more resources that reside on said second computing device;

reducing a network congestion by changing a priority of DESS traffic according to said condition of said DESS; and adjusting, according to said condition of said DESS, one or more of:
a read batch timing setting,
a read batch size setting,
a write batch timing setting, and
a write batch size setting.

2. The one or more non-transitory machine-readable storage medium of claim 1, wherein said management comprises:
appending said indication of said load on said first set of one or more resources to an outgoing file system message; and
transmitting said file system message on to said one or more network links.

3. The one or more non-transitory machine-readable storage medium of claim 1, wherein said management comprises:
in response to said condition of said DESS being an overloaded condition, performing automatic provisioning of additional resources of said first computing device for use by said DESS; and
in response to said condition of said DESS being said overperformance condition, performing automatic provisioning of additional network bandwidth for use by said DESS.

4. The one or more non-transitory machine-readable storage medium of claim 3, wherein said automatic provisioning of additional resources comprises one or more of:
automatic provisioning of an additional processing core for use by said DESS;
automatic provisioning of additional memory for use by said DESS; and
automatic provisioning of additional nonvolatile storage for use by said DESS.

5. The one or more non-transitory machine-readable storage medium of claim 1, wherein said management comprises:
in response to said condition of said DESS being said underloaded condition, performing automatic deprovisioning of resources of said first computing device which were previously provisioned for use by said DESS.

6. The one or more non-transitory machine-readable storage medium of claim 5, wherein said automatic deprovisioning of resources comprises one or more of:
automatic deprovisioning of a processing core previously provisioned for use by said DESS;
automatic deprovisioning of memory previously provisioned for use by said DESS;
automatic deprovisioning of network bandwidth previously provisioned for use by said DESS; and
automatic deprovisioning of nonvolatile storage previously provisioned for use by said DESS.

7. The one or more non-transitory machine-readable storage medium of claim 1, wherein each of said indication of said load on said first set of one or more resources and said indication of said load on said second set of one or more resources comprises one or more of:
an indication of a load on a network link;
an indication of a load on a processing core;
an indication of a load on memory; and
an indication of a load on a storage device.

8. The one or more non-transitory machine-readable storage medium of claim 1, wherein each of said indication of said load on said first set of one or more resources and said indication of said load on said second set of one or more resources comprises one or both of:
an indication of a number of write operations pending; and
an indication of a number of read operations pending.

9. The one or more non-transitory machine-readable storage medium of claim 1, wherein said first set of one or more resources comprises a storage device and said indication of said load on said first set of one or more resources is based on a depth of a buffer of said storage device.

10. The one or more non-transitory machine-readable storage medium of claim 1, wherein said first set of one or more resources comprises one or more file system request buffers that reside on said first computing device.

11. The one or more non-transitory machine-readable storage medium of claim 10, wherein said management comprises:
controlling a rate at which file system requests stored in said one or more file system buffers are serviced, wherein said rate is based on said determined condition of said DESS.

12. The one or more non-transitory machine-readable storage medium of claim 11, wherein said controlling said rate comprises controlling one or both of:
an interval at which batches of file system requests are fetched from said one or more buffers; and
a size of each of said batches of file system requests.

13. The one or more non-transitory machine-readable storage medium of claim 11, wherein said controlling said rate comprises separately controlling:
a rate at which file system data requests stored in said one or more buffers are serviced; and
a rate at which file system metadata requests stored in said one or more buffers are serviced.

14. The one or more non-transitory machine-readable storage medium of claim 11, wherein said controlling said rate comprises separately controlling:
  a rate at which file system data read requests stored in said one or more buffers are serviced; and
  a rate at which file system data write requests stored in said one or more buffers are serviced.

15. The one or more non-transitory machine-readable storage medium of claim 1, wherein said determining of said condition of said DESS comprises calculating a choking level which determines a rate at which one or more file system requests are serviced.

16. The one or more non-transitory machine-readable storage medium of claim 1, wherein said management comprises:
  generating an indication of a performance of said DESS; and
  determining said condition of said DESS based on said indication of said performance of said DESS.

17. The one or more non-transitory machine-readable storage medium of claim 16, wherein said management comprises:
  in response to said condition of said DESS being said underperformance condition, performing automatic provisioning of additional resources of said first computing device for use by said DESS.

18. The one or more non-transitory machine-readable storage medium of claim 17, wherein said automatic provisioning of additional resources comprises one or more of:
  automatic provisioning of an additional processing core for use by said DESS;
  automatic provisioning of additional memory for use by said DESS;
  automatic provisioning of additional network bandwidth for use by said DESS; and
  automatic provisioning of additional nonvolatile storage for use by said DESS.

19. The one or more non-transitory machine-readable storage medium of claim 16, wherein said management comprises:
  in response to said condition of said DESS being said overperformance condition, perform automatic deprovisioning of resources of said first computing device which were previously provisioned for use by said DESS.

20. The one or more non-transitory machine-readable storage medium of claim 19, wherein said automatic deprovisioning of resources comprises one or more of:
  automatic deprovisioning of a processing core previously provisioned for use by said DESS;
  automatic deprovisioning of memory previously provisioned for use by said DESS;
  automatic deprovisioning of network bandwidth previously provisioned for use by said DESS; and
  automatic deprovisioning of nonvolatile storage previously provisioned for use by said DESS.

21. A method for managing a distributed electronic storage system (DESS), the method comprising:
  generating, in a first hardware processor component of a first computing device, an indication of a load on a first set of one or more resources that reside on said first computing device, wherein said first set of one or more resources comprises a first network adapter operable to store DESS traffic in a virtual container;
  receiving, from a second hardware processor component of a second computing device via said one or more network links, an indication of a load on a second set of one or more resources that reside on said second computing device, wherein said second set of one or more resources comprises a second network adapter operable to store DESS traffic;
  transmitting, from said first hardware processor component of said first computing device to said second hardware processor component of said second computing device, said indication of said load on said first set of one or more resources that reside on said first computing device, wherein said second hardware processor component of said second computing device is operable to determining said condition of the DESS according said load on said first set of one or more resources that reside on said first computing device;
  determining, in said first hardware processor component of said first computing device, a condition of said DESS based on performance over said one or more network links, said indication of said load on said first set of one or more resources and said indication of said load on said second set of one or more resources, wherein said first computing device is operable to determine said condition as an underloaded condition and said first computing device is operable to determine said condition as an overperformance condition, and wherein said condition is adaptable over time according to a log file generated by a monitor on said local computing device;
  reducing a network congestion by changing a priority of DESS traffic according to said condition of said DESS; and
  adjusting, according to said condition of said DESS, one or more of:
    a read batch timing setting,
    a read batch size setting,
    a write batch timing setting, and
    a write batch size setting.

22. A system comprising:
  a local computing device communicatively coupled to a plurality of remote computing devices via one or more network links, wherein an electronic storage system is distributed among the local computing device and the plurality of remote computing devices;
  wherein the distributed electronic storage system (DESS) is operable to reduce a network congestion and communicate DESS traffic according to a priority, said DESS comprising:
    a first computing device comprising first management circuitry and a first network adapter comprising a first buffer operable to store said DESS traffic, wherein said first buffer is associated with a first depth; and
    a virtual container in a second computing device comprising a second network adapter, wherein said virtual container is operable to store said DESS traffic, and wherein said virtual container is associated with a second depth, said second computing device being communicatively coupled to said first computing device via one or more network links;
  wherein said first management circuitry is operable to change said priority of said DESS traffic according to said first depth, said second depth, and a first condition of said DESS, wherein said first management circuitry is operable to determine said first condition as an underloaded condition and said first management circuitry is operable to determine said first condition as an overperformance condition, and wherein said first condition is adaptable over time according to a first log file generated by a first monitor on said first computing device, and wherein second management circuitry on said second computing device is operable to change said priority of said DESS traffic according to a second condition of said DESS that is adaptable over time according to a second log file generated by a second monitor on said second computing device, and wherein said first management circuitry is operable to adjust, according to said first condition of said DESS, one or more of: a read batch timing setting, a read batch size setting, a write batch timing setting, and a write batch size setting.

\* \* \* \* \*